J. M. HOGAN.
SEED CORN DRYING STAND.
APPLICATION FILED JULY 16, 1915.

1,186,904.

Patented June 13, 1916.

Inventor
J. M. Hogan

UNITED STATES PATENT OFFICE.

JAMES M. HOGAN, OF LEXINGTON, ILLINOIS.

SEED-CORN-DRYING STAND.

1,186,904.  Specification of Letters Patent.  Patented June 13, 1916.

Application filed July 16, 1915. Serial No. 40,315.

*To all whom it may concern:*

Be it known that I, JAMES M. HOGAN, a citizen of the United States, residing at Lexington, in the county of McLean, State of Illinois, have invented certain new and useful Improvements in Seed-Corn-Drying Stands; and I do hereby declare the following to be a full, clear, and exact description of the invention, such as will enable others skilled in the art to which it appertains to make and use the same.

This invention relates to new and useful improvements in racks or stands particularly adapted for holding ears of corns or the like whereby the kernels may be properly dried to adapt them for use as seed.

It is the object of the present invention to provide such a device which will efficiently hold the corn, and which when not in use may be knocked down or collapsed to occupy a minimum amount of space.

It is further the object to provide such a device including a frame wherein the corn carrying portions form part of the essential structure of the frame, in such manner as to provide a substantially rigid structure to insure against accidental collapsing, and wherein a minimum number of securing bolts or other means may be employed, so as to reduce to a minimum the material required for such a rack and the labor necessary in setting it up or collapsing it.

With the above and other objects and advantages in view, the invention resides more particularly in the novel combination, formation and arrangement of parts as more fully described hereinafter and pointed out in the appended claim.

Figures 1, 3:
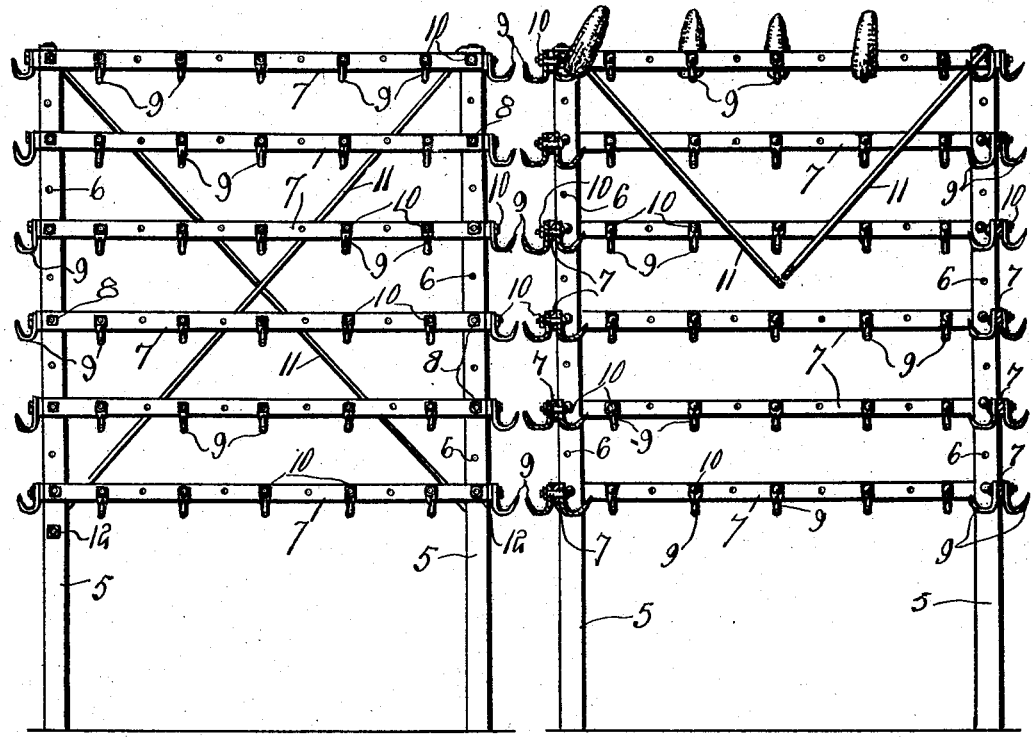
Figure 2:
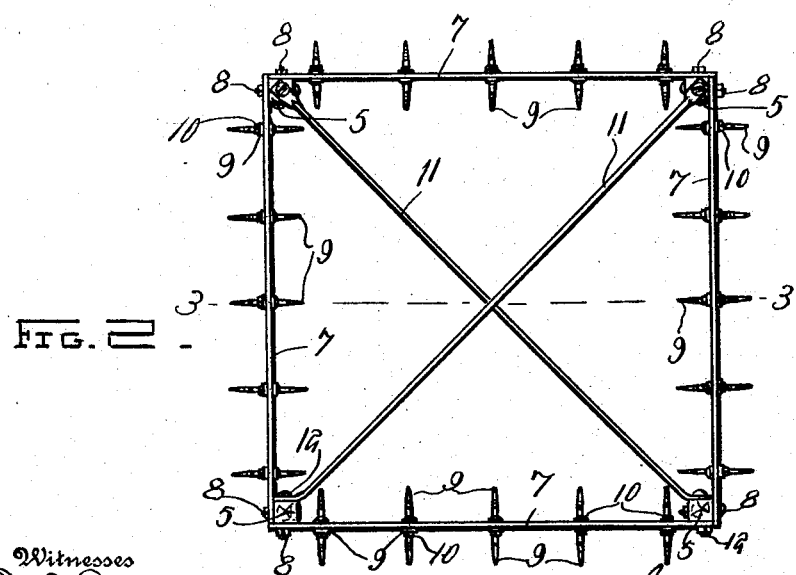

Reference is had to the accompanying drawings, wherein similar characters of reference designate corresponding parts throughout the several views, and in which:

Figure 1 is an elevational view of the improved seed corn drying stand. Fig. 2 is a top plan view thereof. Fig. 3 is a sectional view on line 3—3 of Fig. 2.

Referring now more particularly to the accompanying drawings, the preferred form of the improved stand is shown as comprising four corner posts 5 which are preferably square in cross section, and which are formed on the outer faces with the series of openings 6 whereby the ends of the corn securing strips 7 may be secured, as by the bolts or screws 8. Any number of strips may be employed in proportion to the amount of corn desired to be stored on the stand, and these strips form the sides of the stand.

For supporting the corn, angular prong members 9 are provided and secured to the strips 7, which are preferably formed of strap metal by bolts 10 passed therethrough and through one of the arms of the prong members, each bolt serving to secure a prong on each side of the strip.

To prevent collapse of the structure described, a pair of brace links 11 are provided, each of which extend from the upper end of one post to the lower end of the diagonally opposite post, the ends of the braces being secured, as by the bolts 12 passing through their flattened ends.

By the structure described, the corn carrying strips 7 form part of the essential structure of the frame, and the frame is held against collapsing as stated, by the links so that an economy of structure and an economy of labor in assembling the device is effected, as a securing means for each end of the various strips and braces being composed of only one bolt or screw.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claim.

What I claim is:

A stand of the class described, comprising a rectangular frame including corner posts, horizontal carrying strips secured to the posts by a bolt passing through each end of each strip, and through the adjacent post, and a pair of links each extending from the upper end of one post to the lower end of the diagonally opposite post.

In testimony whereof, I affix my signature, in the presence of two witnesses.

JAMES M. HOGAN.

Witnesses:
 JOHN MORRESLY,
 THOMAS HOGAN.